USO08429033B2

(12) United States Patent
Kreifels et al.

(10) Patent No.: US 8,429,033 B2
(45) Date of Patent: Apr. 23, 2013

(54) AUTOMATICALLY ADJUSTING INVENTORY BASED ON LOANER PARTS AND ORDER DEMANDS

(75) Inventors: Brian Timothy Kreifels, Rochester, MN (US); Ryan T. Paske, Rochester, MN (US); William Robert Taylor, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 11/847,689

(22) Filed: Aug. 30, 2007

(65) Prior Publication Data

US 2009/0063305 A1 Mar. 5, 2009

(51) Int. Cl.
*G06Q 10/00* (2012.01)
(52) U.S. Cl.
USPC .............................. 705/28; 705/29
(58) Field of Classification Search ............ 705/28, 705/29
See application file for complete search history.

(56) References Cited

U.S. PATENT DOCUMENTS

| 5,630,070 | A  | * | 5/1997  | Dietrich et al. ............ 705/7.23 |
| 7,020,534 | B2 |   | 3/2006  | Morii |
| 7,289,968 | B2 | * | 10/2007 | Ferreri et al. ................... 705/28 |
| 2001/0034656 | A1 | * | 10/2001 | Lucas et al. ..................... 705/26 |
| 2002/0161674 | A1 | * | 10/2002 | Scheer ........................... 705/28 |
| 2003/0055753 | A1 | * | 3/2003  | Dellar et al. .................... 705/29 |
| 2003/0069739 | A1 |   | 4/2003  | Wylie |
| 2003/0182299 | A1 |   | 9/2003  | Burns |
| 2004/0236641 | A1 | * | 11/2004 | Abbott et al. ................... 705/28 |
| 2005/0187834 | A1 |   | 8/2005  | Painter et al. |
| 2006/0190291 | A1 | * | 8/2006  | Erickson et al. ................. 705/1 |
| 2006/0212151 | A1 |   | 9/2006  | Taguchi |

OTHER PUBLICATIONS

Rood, Stephen C., Avoiding the PC Maintenance Blues. Jun. 1, 1991, Datamation v37, n11, p. 41.*
Broder, Bryant, a sensible approach to managing instrument repairs, Jul. 2002, Healthcare Publishing News, v26, n7, pp46.*

* cited by examiner

*Primary Examiner* — Scott Zare
*Assistant Examiner* — Talia Crawley
(74) *Attorney, Agent, or Firm* — Yee & Associates, P.C.; Steven L. Bennett

(57) ABSTRACT

A system for performing a part inventory analysis is provided. In response to determining a current part inventory, current order demands on the current part inventory are determined. The current part inventory is segmented. An order demand coverage is determined for each segment of the segmented inventory based on the current order demands. A conditioned part inventory is determined based on a loaner part inventory analysis of the segmented inventory. A part purchase recommendation is calculated based on the conditioned part inventory. Then, data for the segmented inventory, the order demand coverage, the conditioned part inventory, and the part purchase recommendation are stored in a storage device.

18 Claims, 5 Drawing Sheets

| INVENTORY DEMAND COVERAGE AND PURCHASE REQUIREMENTS REPORT 300 | | | | |
|---|---|---|---|---|
| | NEW PARTS 306 | LOANER PARTS 308 | USED PARTS 310 | TOTAL PARTS 312 |
| 302 — PART DEMAND | 290 | 10 | N/A | 300 |
| 304 — PART INVENTORY | 5 | 300 | 2 | 307 |
| | | | | LPIA |
| 314 — USED PART DEMAND COVERAGE | | | | 2 |
| 316 — LOANER PART DEMAND COVERAGE | | | | 290 |
| 318 — NEW PART DEMAND COVERAGE | | | | 5 |
| 320 — CONDITIONED PART INVENTORY | | | | 297 |
| 322 — UNSATISFIED PARTS REQUIRING ADDITIONAL PURCHASE | | | | 3 |

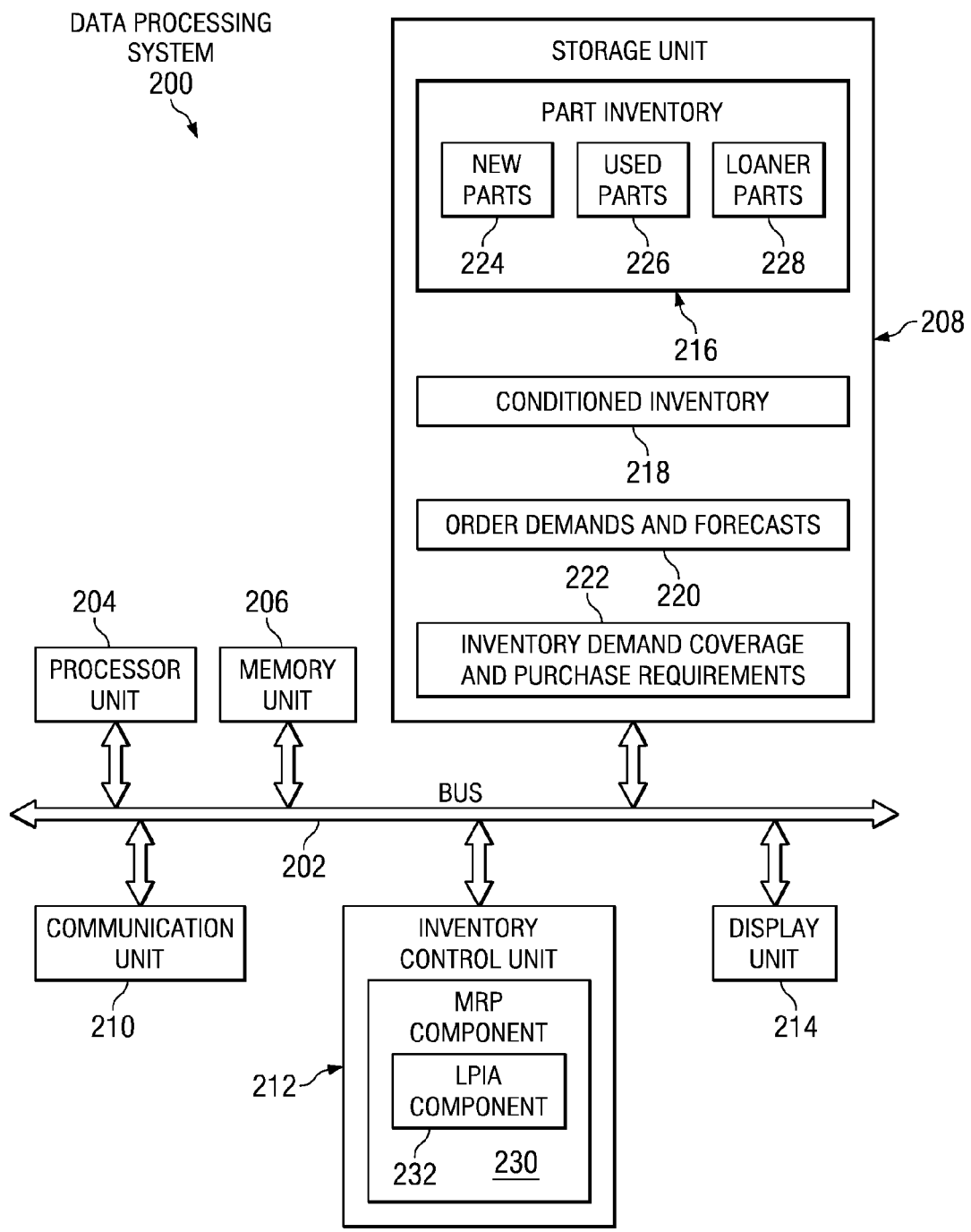

FIG. 4

| TIME PHASED REPORT 400 | | | | |
|---|---|---|---|---|
| PART NUMBER A 402 | WEEK 1 404 | WEEK 2 406 | WEEK 3 408 | TOTAL |
| PART INVENTORY NEW | 50 | 0 | 0 | 50 |
| PART INVENTORY LOANER | 100 | 10 | 0 | 110 |
| PURCHASE ORDER | 0 | 10 | 30 | 40 |
| TOTAL INVENTORY COVERAGE | 150 | 20 | 30 | 200 |
| | | | | |
| PART DEMAND NEW | 50 | 25 | 25 | 100 |
| PART DEMAND LOANER | 100 | 50 | 25 | 175 |
| PART DEMAND TOTAL | 150 | 75 | 50 | 275 |
| | | | | |
| LIPA INVENTORY NEW + PO | 50 | 10 | 30 | |
| LIPA INVENTORY LOANER | 50 | 25 | 25 | |
| LIPA TOTAL INVENTORY COVERAGE | 100 | 35 | 55 | |
| LIPA UNAVAILABLE INVENTORY LOANER | 50 | 35 | 10 | |
| | | | | |
| LIPA MRP RECOMMENDATION | 50 | 40 | 0 | 90 |

- 410: Part Inventory New, Part Inventory Loaner, Purchase Order, Total Inventory Coverage
- 412: Part Demand New, Part Demand Loaner, Part Demand Total
- 414: LIPA Inventory New + PO, LIPA Inventory Loaner, LIPA Total Inventory Coverage, LIPA Unavailable Inventory Loaner
- 416: LIPA MRP Recommendation

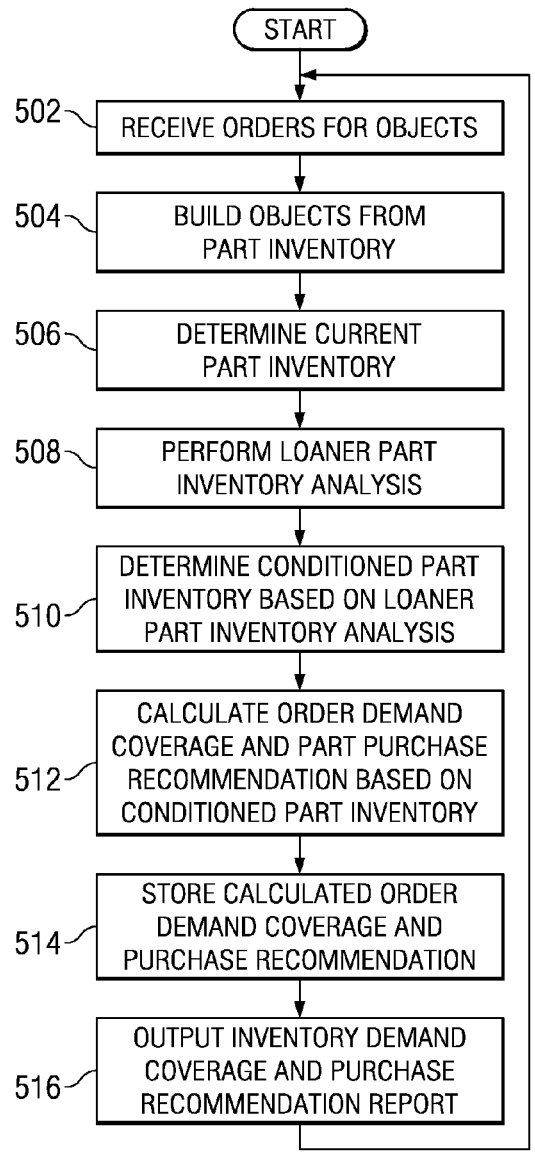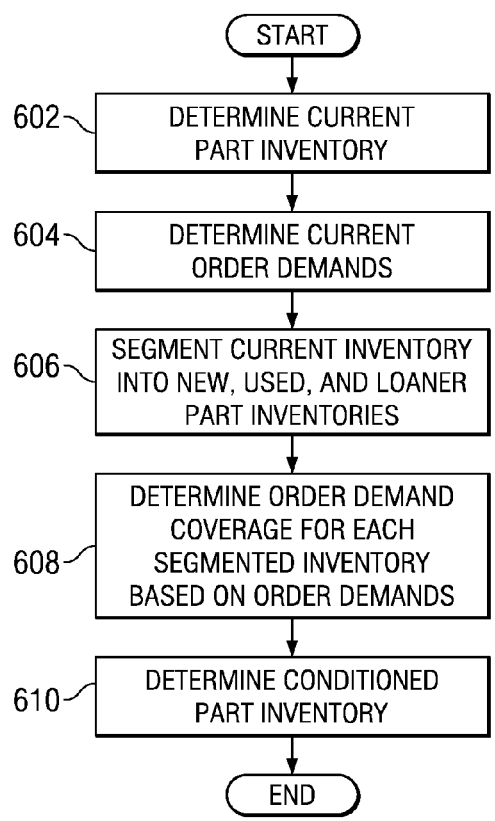

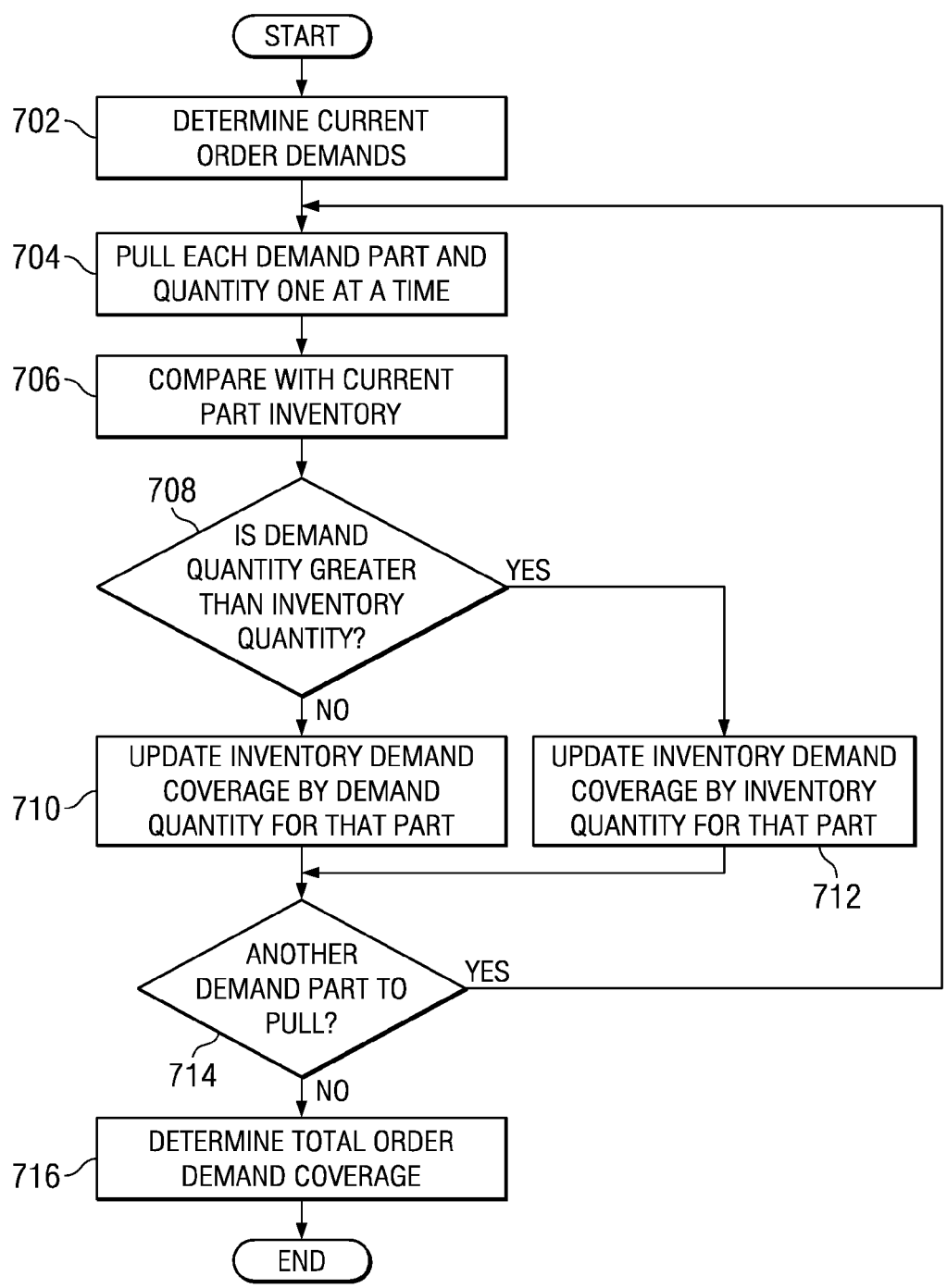

US 8,429,033 B2

AUTOMATICALLY ADJUSTING INVENTORY BASED ON LOANER PARTS AND ORDER DEMANDS

BACKGROUND OF THE INVENTION

1. Field of the Invention

The present invention relates generally to an improved manufacturing process control system. More specifically, the present invention is directed to a computer implemented method, system, and computer usable program code for automatically adjusting inventory based on a loaner part inventory analysis and order demands and forecasts.

2. Description of the Related Art

Today, manufacturers are always in a state of flux, which is caused by assembling and disassembling vast numbers of specialized products. Manufacturers assemble these specialized products to the customer-defined configuration requirements of product orders. Disassembling these specialized products may result from various events, such as, for example, returned products built for failure analysis testing, returned products built as loaners to other departments within the manufacturing company during a warranty period, or products that were used and returned by customers.

A problem encountered by manufacturers is determining an accurate part inventory that not only includes new parts, but also includes these returned used and loaner parts to inventory. In addition, another problem encountered by manufacturers is keeping track of order demands produced by external customer orders, as well as internal department orders, and forecasting future order demands to determine part purchasing requirements.

For example, situations arise where new parts, which were utilized in a loaner program and are still under warranty, may no longer be used to build future loaner machine orders. In addition, used parts may not be used to build future new customer machine orders. Thus, the inventory required to ensure that the right number of parts are purchased to fill all order demand types within a specified time period is critical to manufacturing planning.

Currently, no manufacturing planning system has the capability to ensure that demand coverage is against specific inventory categories, such as new, used, and loaner parts. Also, no automated planning process presently exists to allow for segmentation of new, used, and loaner parts to have inventory available for future order demands. Because there is a current lack of automatic inventory segmentation, significant manually intensive planning work is required of manufacturing personnel. Moreover, ineffective management of these returned used and loaner parts to inventory results.

Therefore, it would be beneficial to have an improved computer implemented method, system, and computer usable program code for analyzing used and loaner part inventory and utilizing this analysis to determine which parts are required to be purchased.

BRIEF SUMMARY OF THE INVENTION

Illustrative embodiments provide a computer implemented method, system, and computer usable program code for performing a part inventory analysis. In response to determining a current part inventory, current order demands on the current part inventory are determined. The current part inventory is segmented. Order demand coverage is determined for each segment of the segmented inventory based on the current order demands. A conditioned part inventory is determined based on a loaner part inventory analysis of the segmented inventory. A part purchase recommendation is calculated based on the conditioned part inventory. Then, data for the segmented inventory, the order demand coverage, the conditioned part inventory, and the part purchase recommendation are stored in a storage device.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a block diagram of a data processing system in which illustrative embodiments may be implemented;

FIG. 4 is an exemplary illustration of a time phased report in accordance with an illustrative embodiment;

FIG. 5 is a flowchart illustrating an exemplary process for calculating order demand coverage and part purchase recommendations based on a conditioned part inventory in accordance with an illustrative embodiment;

FIG. 6 is a flowchart illustrating an exemplary process for a loaner part inventory analysis in accordance with an illustrative embodiment; and FIG. 7 is a flowchart illustrating an exemplary process for determining inventory demand coverage in accordance with an illustrative embodiment.

DETAILED DESCRIPTION OF THE INVENTION

Figures 1, 3:
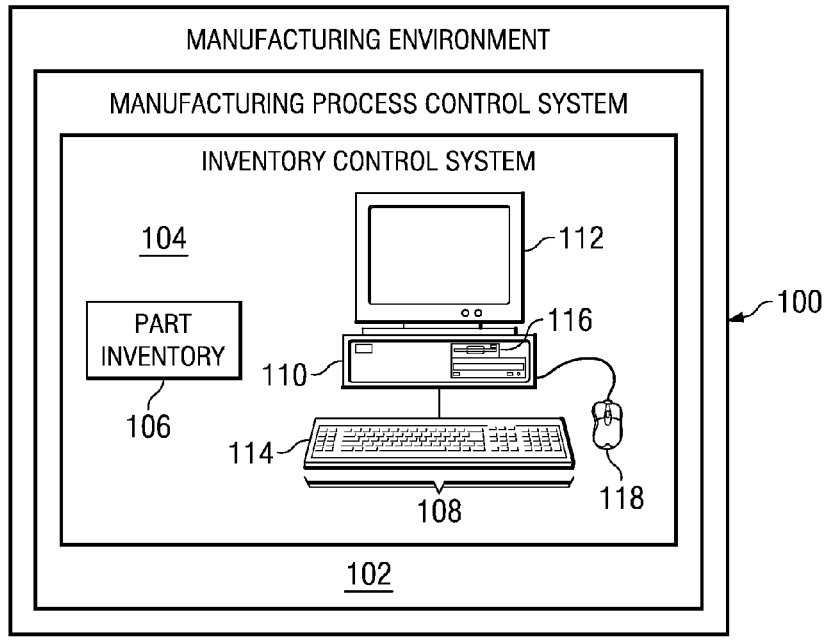
FIG. 1 is a pictorial representation of a manufacturing environment in which illustrative embodiments may be implemented.
FIG. 3 is an exemplary illustration of an inventory demand coverage and purchase requirements report in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a manufacturing environment in which illustrative embodiments may be implemented. Manufacturing environment 100 may, for example, represent one or more manufacturing facilities, which build manufacturing objects or units from a plurality of inventory parts. An inventory part may include a single part or two or more parts put together to form an assembly or subassembly. A manufacturing object or unit is a final product produced by the manufacturing process. The manufacturing unit may, for example, be a build-to-order computer. However, it should be noted that manufacturing environment 100 may utilize illustrative embodiments to produce any type of manufacturing unit.

Manufacturing environment 100 includes manufacturing process control system 102. Manufacturing environment 100 utilizes manufacturing process control system 102 to monitor, control, and record the manufacturing process for building the manufacturing units. Manufacturing process control system 102 includes all equipment and components necessary to build the manufacturing units.

Also, manufacturing process control system 102 includes inventory control system 104. Inventory control system 104 monitors, analyzes, and controls a part inventory, such as part inventory 106. Part inventory 106 represents a plurality of inventory parts. Manufacturing process control system 102 uses the parts in part inventory 106 to build the manufacturing units.

Inventory control system 104 includes computer 108 for monitoring, analyzing, and controlling part inventory 106. However, it should be noted that inventory control system 104 may include a plurality of computers and other devices, which are coupled together via a network. Inventory control system 104 uses this network to provide communications links between the various computers and other devices connected together within the network. The network may include connections, such as wire, wireless communication links, or fiber optic cables.

In addition, manufacturing process control system 102 may include one or more servers coupled to the network, along with one or more storage units. The one or more servers may provide data, such as boot files, operating system images, and applications to computer 108 and other devices coupled to the network. The one or more storage units may provide data storage capabilities for manufacturing process control system 102.

The network may, for example, be the Internet, which represents a worldwide collection of networks and gateways that use the Transmission Control Protocol/Internet Protocol (TCP/IP) suite of protocols to communicate with one another. Of course, manufacturing process control system 102 may also use a number of different types of networks, such as, for example, an intranet, a local area network (LAN), or a wide area network (WAN).

Computer 108 includes system unit 110, video display terminal 112, keyboard 114, storage devices 116, which may include floppy drives and other types of permanent and removable storage media, and mouse 118. Also, computer 108 may include additional input devices. Examples of additional input devices include a joystick, touchpad, touch screen, trackball, microphone, and the like.

Computer 108 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems, such as a network computer. Computer 108 also preferably includes a graphical user interface (GUI) that may be implemented by means of systems software residing in computer readable media in operation within computer 108. FIG. 1 is only intended as an example and not as an architectural limitation for different embodiments.

Next, FIG. 2 depicts a block diagram of a data processing system in which illustrative embodiments may be implemented. Data processing system 200 is an example of a computer, such as computer 108 in FIG. 1, in which code or instructions implementing the processes of the illustrative embodiments may be located.

In the depicted example, data processing system 200 employs a bus architecture, such as bus 202. Bus 202 may represent one or more buses. In addition, bus 202 may be implemented using any type of communication fabric or architecture that provides for a transfer of data between the different components and devices coupled to bus 202.

Data processing system 200 includes processor unit 204, memory unit 206, storage unit 208, communication unit 210, inventory control unit 212, and display unit 214, which couple to bus 202. However, it should be noted that data processing system 200 is only shown for exemplary purposes and is not meant as an architectural limitation to illustrative embodiments. In other words, data processing system 200 may include more or fewer components as necessary to accomplish processes of illustrative embodiments.

Processor unit 204 provides the data processing capabilities of data processing system 200. An operating system (OS) runs on processor unit 204. This OS coordinates and controls various components within data processing system 200. The OS may be a commercially available OS, such as, for example, Microsoft® Windows Vista™. Microsoft® and Windows Vista™ are trademarks of Microsoft Corporation in the United States, other countries, or both. An object oriented programming system, such as the Java™ programming system, may run in conjunction with the OS and provides calls to the OS from Java™ programs or applications executing on data processing system 200. Java™ and all Java-based trademarks are trademarks of Sun Microsystems, Inc. in the United States, other countries, or both.

Storage unit 208 is a non-volatile data storage device that may, for example, be configured as ROM and/or flash ROM to provide the non-volatile memory for storing the OS, applications, and/or other data. Storage unit 208 may represent a plurality of storage devices, such as, for example, storage devices 116 in FIG. 1. Storage unit 208 stores the instructions or computer usable program code for the OS and applications. The instructions are loaded into memory unit 206 for execution by processor unit 204. Processor unit 204 performs processes of illustrative embodiments by executing the computer usable program code that is loaded into memory unit 206. Additionally, the processes of the illustrative embodiments may be applied to a multiprocessor data processing system.

The other data stored in storage unit 208 includes part inventory 216, conditioned inventory 218, order demands and forecasts 220, and inventory demand coverage and purchase requirements 222. Part inventory 216 is statistical data with regard to a part inventory, such as, for example, part inventory 106 in FIG. 1. Part inventory 216 data includes numbers and types of parts within the part inventory. Further, part inventory 216 is segmented into new parts 224, used parts 226, and loaner parts 228.

New parts 224 represent parts in the inventory that are new from a manufacturer. New parts 224 are available to be installed in all product orders, which may be received from either an external customer or an internal department, such as a testing lab. Used parts 226 represent parts that were used and returned by an external customer. Also, used parts 226 may represent parts that were kept by an internal department for a longer period of time than is legally allowed to be called a loaner part. Used parts 226 are not available to be installed in new external customer orders; however, used parts 226 may be installed in new internal department or lab orders.

Loaner parts 228 represent parts that were utilized by an internal department or lab in a loaner program for less than the legally determined period of time, such as, for example, six months. In other words, the internal department or lab borrowed these parts from the part inventory for a specified period of time. It should be noted that inventory parts may be used only once in the loaner program for that purpose. Loaner parts 228 are parts that are still under warranty and are only available to be installed in new external customer orders.

Conditioned inventory 218 is data that represents the current part inventory, which is conditioned or adjusted by including additional data regarding loaner and used parts. In other words, conditioned inventory 218 takes into account all possible part sources, such as new, used, and loaner parts, to meet order demands. A loaner part inventory analysis is used to condition the current inventory for calculating conditioned inventory 218.

The loaner part inventory analysis determines part purchasing requirements based on current used part demand coverage, current loaner part demand coverage, and current new part demand coverage. Demand coverage is the number of product orders the current inventory levels will fill in relation to used, loaner, and new parts. An order demand is a demand placed on the part inventory to fill a particular order.

Order demands and forecasts 220 is data relating to the current number of demands placed on the part inventory by orders and forecasts for future order demands over predetermined periods of time. Future order demand forecasts may project order demands one, two, three, four, or more weeks into the future to help predict part buying needs to meet serviceability requirements. A serviceability requirement is a requirement to meet a quoted lead time to a customer for delivery of a manufactured product.

Inventory demand coverage and purchase requirements 222 is data that relates to the amount of currently available inventory to cover order demands. In addition, inventory demand coverage and purchase requirements 222 is data that includes the number and type of parts required to be purchased to meet current and future order demands. Moreover, it should be noted that storage unit 208 may contain any other necessary data for processes of illustrative embodiments to properly execute.

Data processing system 200 uses communication unit 210 to communicate with other data processing systems and devices within the manufacturing environment, such as, for example, manufacturing environment 100 in FIG. 1, via a network. Communication unit 210 may include one or more devices used to transmit and receive data. For example, communication unit 210 may include a network adapter and/or a modem to send and receive wire and wireless transmissions.

Data processing system 200 uses inventory control unit 212 to monitor and control the part inventory, which is used to produce the manufacturing units or objects. Further, inventory control unit 212 records, stores, and analyzes data relating to the part inventory. It should be noted that inventory control unit 212 may be implemented entirely as software, hardware, or a combination of software and hardware components. Furthermore, even though in this exemplary illustration inventory control unit 212 resides in data processing system 200, inventory control unit 212 may be remotely located.

Inventory control unit 212 includes material requirements planning (MRP) component 230 and loaner part inventory analysis (LPIA) component 232. MRP component 230 is a software-based production planning and inventory control system used to manage manufacturing processes. An MRP system is utilized to ensure materials and products are available for production and delivery to customers, while managing inventory levels and planning execution of various manufacturing activities.

Inventory control unit 212 uses LPIA component 232 to perform the loaner part inventory analysis on the current part inventory. LPIA component 232 conditions the current part inventory in order to determine conditioned inventory 218. Subsequently, LPIA component 232 calculates the conditioned inventory demand coverage and the purchasing requirements based on conditioned inventory 218. LPIA component 232 may, for example, be a plug-in to MRP component 230 or a stand-alone software application.

Display unit 214 may, for example, be video display terminal 112 in FIG. 1. Data processing system 200 may use display unit 214 to output part inventory data to a system administrator or other user. The displayed part inventory data may include any or all of part inventory 216, conditioned inventory 218, order demands and forecasts 220, and inventory demand coverage and purchase requirements 222.

The depicted examples in FIG. 1 and FIG. 2 are not meant to imply architectural limitations. In addition, the illustrative embodiments provide for a computer implemented method, system, and computer usable program code for compiling source code and for executing code. The methods described, with respect to the depicted embodiments, may be performed in a data processing system, such as computer 108 shown in FIG. 1 or data processing system 200 shown in FIG. 2.

Illustrative embodiments provide a computer implemented method, system, and computer usable program code for performing a loaner part inventory analysis. In response to determining a current part inventory, an inventory control unit determines current order demands on the current part inventory. Then, the inventory control unit uses a LPIA component to segment the current part inventory into a segmented new, used, and loaner part inventory. Afterward, the LPIA component determines an order demand coverage for each segment of the segmented inventory based on the current order demands. In addition, the LPIA component determines a conditioned part inventory based on a loaner part inventory analysis of the segmented inventory. Subsequently, the inventory control unit may use the standard MRP to calculate the part purchase recommendation based on the conditioned part inventory and store data relating to the inventory in a storage device. Further, the inventory control unit outputs the stored inventory data in a report for a user to review.

Moreover, in response to determining the current order demands on the current part inventory, the LPIA component pulls each demand part and quantity one at a time. Then, the LPIA component compares the demand quantity for the part with a current part inventory quantity for the part. If the demand quantity for the part is greater than the current inventory quantity for the part, the LPIA component updates the conditioned part inventory by the current inventory quantity for the part. If the demand quantity for the part is not greater than the current inventory quantity for the part, the LPIA component updates the conditioned part inventory by the demand quantity for the part. Afterward, the LPIA component determines a total conditioned part inventory available for MRP consideration.

Thus, illustrative embodiments modify a standard MRP inventory netting process by altering the way loaner and used part inventory is analyzed and applied to determine which parts are required to be purchased. As a result, illustrative embodiments maximize the potential for on-hand inventory to meet serviceability requirements. In addition, illustrative embodiments minimize the potential for inventory carrying costs and scrap. Further, illustrative embodiments reduce manual workload to meet variable coverage and purchasing. Furthermore, illustrative embodiments reduce the risk of short part supplies and under planning part needs.

When illustrative embodiments execute an MRP planning process, instead of taking a straight retrieval from the inventory system, illustrative embodiments execute the LPIA process to condition the inventory balances. This LPIA process retrieves the current inventory and the order demand on the inventory. The inventory required to cover the demand within a configurable time frame, such as, for example, thirty days, as well as inventory that is not set up in LPIA, is left as is and passed to the MRP system.

The inventory set to be conditioned in the LPIA process goes through the following logic. Reduce the available inventory by the unused used parts that cannot be applied to internal customer order demands. Continue to reduce the available inventory by unused loaner parts that cannot be used against external customer order demands. Then, the MRP system may use the resulting conditioned inventory as the netted available inventory from the LPIA process.

With reference now to FIG. 3, an exemplary illustration of an inventory demand coverage and purchase requirements report is depicted in accordance with an illustrative embodiment. Inventory demand coverage and purchase requirements report 300 is a report resulting from a loaner part inventory analysis and may, for example, be obtained from data stored in inventory demand coverage and purchase requirements 222 in FIG. 2. Inventory demand coverage and purchase requirements report 300 shows the current demand coverage of the part inventory, such as part inventory 106 in FIG. 1. In addition, inventory demand coverage and purchase requirements report 300 shows the current unsatisfied purchasing requirements for the part inventory.

Inventory demand coverage and purchase requirements report 300 includes part demand 302 and part inventory 304. Part demand 302 shows the current demand driven from expected order load. Part inventory 304 shows the current part inventory levels or balances. Part demand 302 and part inventory 304 are segmented into new parts 306, loaner parts 308, used parts 310, and total parts 312. New parts 306 represents the number of new parts needed to cover expected demands 302 and the number of available new parts in part inventory 304. In this example, part demand 302 for new parts 306 is two hundred ninety. In other words, there are currently two hundred ninety parts required to fulfill external customer orders. Also, part inventory 304 shows five new parts 306 in the new part inventory.

Loaner parts 308 represents the number of loaner parts needed for part demand 302 and the number of available loaner parts in part inventory 304. In this example, part demand 302 for loaner parts 308 is ten. In other words, there are currently ten parts required to fulfill the loaner program requests. Loaner program requests may be made up of internal department or lab orders. Also, part inventory 304 shows three hundred loaner parts 308, which were returned to the loaner part inventory from the loaner program.

Used parts 310 represents the number of used parts needed for part demand 302 and the number of available used parts in part inventory 304. In this example, part demand 302 for used parts 310 is zero. In other words, there are currently no demands for used parts. Also, part inventory 304 shows two used parts 310, which were returned by external customers or kept too long in the loaner program.

Total parts 312 represents an accumulative total number for part demand 302 and part inventory 304, which includes new parts 306, loaner parts 308, and used parts 310. In this example, total parts 312 for part demand 302 is three hundred. Also, total parts 312 for part inventory 304 is three hundred seven. It should be noted that current industry practice is to always assume 100% of the part inventory is available for all current order demands. As a result, a manufacturer using current industry practices will assume that all three hundred seven parts of part inventory 304 are available to meet all three hundred current order demands from part demand 302.

However, a manufacturer utilizing an illustrative embodiment will find that the current industry practice assumption that all three hundred seven parts are available to meet current part demand 302 is a false assumption in this example. In other words, based on a loaner part inventory analysis, a manufacturer utilizing an illustrative embodiment will discover that not all three hundred seven parts in inventory are available to meet all three hundred current order demands.

As shown in FIG. 3, inventory demand coverage and purchase requirements report 300 also includes a loaner part inventory analysis for part demand 302 and part inventory 304. The loaner part inventory analysis (LPIA) includes used part demand coverage 314, loaner part demand coverage 316, new part demand coverage 318, conditioned part inventory 320, and unsatisfied parts requiring additional purchase 322. Used part demand coverage 314 represents the number of currently available used parts that may be applied to either used parts demand and/or loaner parts demand. Used parts may only be utilized in internal department or lab loaner program order demands or remanufactured products. In this example, used part demand coverage 314 is two, since the amount of loaner part demand 308 and used parts demands 310 exceed the available used inventory 310.

Loaner part demand coverage 316 represents the number of currently available loaner parts to cover external customer order demands. Loaner parts may only be utilized to satisfy new external customer order demands. In this example, loaner part demand coverage 316 is two hundred ninety, since the amount of external customer part demands exceed the available loaner inventory.

New part demand coverage 318 represents the number of currently available new parts in part inventory 304. In this example, new part demand coverage 318 is five, which is the same number as new parts 306 for part inventory 304. Conditioned part inventory 320 represents the total number of used, loaner, and new parts currently available to satisfy current part demands that utilize these types of parts. In other words, conditioned part inventory 320 is a conditioned part inventory balance based on a loaner part inventory analysis, which includes a segmented used, loaner, and new part inventory. In this example, conditioned part inventory 320 is two hundred ninety seven.

Consequently, according to the loaner part inventory analysis, only two hundred ninety seven of the three hundred seven total parts 312 of part inventory 304 are currently available to fill the three hundred total part demands 302. As a result, three more parts are required to be purchased to fill the current part demand 302. Thus, unsatisfied parts requiring additional purchase 322 is three.

With reference now to FIG. 4, an exemplary illustration of a time phased report is depicted in accordance with an illustrative embodiment. Time phased report 400 is a report that projects or forecasts inventory demand for a particular part, such as part number A 402, over predetermined periods of time, such as week one 404, week two 406, and week three 408, to prevent inventory shortfalls and to meet customer serviceability requirements. As a result, illustrative embodiments are not limited to only matching current order demands against current part inventory as shown in inventory demand coverage and purchase requirements report 300 in FIG. 3. Instead, time phased report 400 may project or forecast future order demands over several weeks or months to meet future order demands and customer serviceability requirements.

Time phased report 400 includes part inventory 410, part demand 412, and conditioned inventory 414. Part inventory 410 represents the segmented part inventory levels to cover projected order demands. Part demand 412 represents the segmented part demands on the inventory. Conditioned inventory 414 represents the segmented part inventory levels to cover projected parts demands based on a loaner part inventory analysis. Further, time phased report 400 includes recommendation 416. Recommendation 416 is the loaner part inventory analysis recommendation for future part purchasing requirements.

In this example, the total inventory coverage in week one 404 is one hundred fifty. The total part demand in week one 404 also is one hundred fifty. However, the total LIPA conditioned inventory coverage in week one 404 is only one hundred. Thus, recommendation 416 in week one 404 is fifty to meet the unsatisfied part demand.

With reference now to FIG. 5, a flowchart illustrating an exemplary process for calculating order demand coverage and part purchase recommendations based on a conditioned part inventory is shown in accordance with an illustrative embodiment. The process shown in FIG. 5 may be implemented in an inventory control unit, such as, for example, inventory control unit 212 in FIG. 2.

The process begins when the inventory control unit uses an MRP component, such as, for example, MRP component 230 in FIG. 2, to receive orders for manufactured units or objects (step 502). The MRP component may receive object orders from both external customers and internal departments. After receiving the object orders in step 502, the MRP component builds the ordered objects utilizing a part inventory, such as part inventory 106 in FIG. 1 (step 504).

After a predetermined time period, such as, for example, thirty days, the inventory control unit determines the current inventory levels (step 506). Then, the inventory control unit uses a LPIA component, such as, for example, LPIA component 232 in FIG. 2, to perform a loaner part inventory analysis on the current inventory levels (step 508). Subsequently, the LPIA component determines the conditioned part inventory based on the loaner part inventory analysis (step 510).

After determining the conditioned part inventory in step 510, the MRP component calculates the order demand coverage and part purchase recommendation based on the conditioned part inventory (step 512). Then, the MRP component stores the calculated order demand coverage and purchase recommendation data in a storage unit, such as, for example, storage unit 208 in FIG. 2 (step 514). Subsequently, the inventory control unit automatically outputs an inventory demand coverage and purchase recommendation report, such as, for example, inventory demand coverage and purchase requirements report 300 in FIG. 3, in a display unit, such as, for example, display unit 214 in FIG. 2, for a user to review (step 516). However, it should be noted that the inventory control unit may output the inventory and purchase recommendation report in the display unit anytime in response to a user input from, for example, a keyboard or mouse, such as keyboard 114 or mouse 118 in FIG. 1. Then, the process returns to step 502 where the MRP component continues to receive orders for objects.

With reference now to FIG. 6, a flowchart illustrating an exemplary process for a loaner part inventory analysis is shown in accordance with an illustrative embodiment. The process shown in FIG. 6 may be implemented in an inventory control unit, such as, for example, inventory control unit 212 in FIG. 2. In addition, the process shown in FIG. 6 is performed during the loaner part inventory analysis at step 508 in FIG. 5.

The process begins when the inventory control unit determines the current part inventory levels (step 602). Subsequent to, or concurrent with, determining the current part inventory levels in step 602, the inventory control unit determines the current order demands on the current part inventory (step 604). Then, the inventory control unit utilizes a LPIA component, such as, for example, LPIA component 232 in FIG. 2, to segment the current inventory into new, used, and loaner part inventories (step 606).

After segmenting the current inventory in step 606, the LPIA component determines the order demand coverage for each of the new, used, and loaner part inventories based on the current order demands and future forecasts for each of these segmented inventories (step 608). Then, the LPIA component determines the conditioned part inventory (step 610). The process terminates thereafter.

With reference now to FIG. 7, a flowchart illustrating an exemplary process for determining inventory demand coverage is shown in accordance with an illustrative embodiment. The process shown in FIG. 7 may be implemented in an inventory control unit, such as, for example, inventory control unit 212 in FIG. 2. In addition, the process shown in FIG. 7 is performed during the loaner part inventory analysis at step 608 in FIG. 6.

The process begins when the inventory control unit determines the current order demands on the current part inventory (step 702). Subsequent to determining the current order demand in step 702, the inventory control unit utilizes a LPIA component, such as, for example, LPIA component 232 in FIG. 2, to pull each demand part and quantity one at a time (step 704). Then, the LPIA component compares the pulled demand part and quantity with the current part inventory levels (step 706).

After comparing the pulled demand part and quantity with the current part inventory levels in step 706, the LPIA component makes a determination as to whether the demand quantity is greater than the inventory quantity for that particular part (step 708). If the demand quantity is not greater than the inventory quantity, no output of step 708, then the LPIA component updates the inventory demand coverage by the demand quantity for that part (step 710). Thereafter, the process proceeds to step 714. If the demand quantity is greater than the inventory quantity, yes output of step 708, then the LPIA component updates the inventory demand coverage by the inventory quantity for that part (step 712).

Then, the LPIA component makes a determination as to whether another demand part needs to be pulled (step 714). If another demand part does need to be pulled, yes output of step 714, then the process returns to step 704 where the LPIA pulls another demand part and quantity. If another demand part does not need to be pulled, no output of step 714, then the LPIA component determines the total order demand coverage (step 716). The process terminates thereafter.

Thus, illustrative embodiments provide a computer implemented method, system, and computer usable program code for performing a loaner part inventory analysis on current inventory levels to obtain a conditioned part inventory that includes new, used, and loaner parts. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for performing a part inventory analysis, the computer implemented method comprising:
    responsive to determining a current part inventory, determining by the data processing system current order demands on the current part inventory;
    segmenting by the data processing system the current part inventory into a new part inventory segment, a used part inventory segment, and a loaner part inventory segment to form a segmented part inventory;
    determining by the data processing system an order demand coverage for each segment of the segmented part inventory based on the current order demands for new parts in the new part inventory segment used to fill both external orders and internal orders, used parts in the used part inventory segment used to only fill internal orders, and loaner parts in the loaner part inventory segment used to only fill external orders;
    determining by the data processing system a conditioned part inventory for each segment of the segmented part inventory based on a loaner part inventory analysis, wherein the loaner part inventory analysis reduces available inventory in the used part inventory segment by a number of used parts that cannot be used to fill internal order demands and reduces available inventory in the loaner part inventory segment by a number of loaner parts that cannot be used to fill external order demands to obtain a netted available inventory;
    calculating by the data processing system a part purchase recommendation based on the conditioned part inventory; and
    storing by the data processing system data for the segmented part inventory, the order demand coverage, the conditioned part inventory, and the part purchase recommendation in a storage device to form stored inventory data.

2. The computer implemented method of claim 1, further comprising:
    responsive to determining the current order demands on the current part inventory, pulling a demand part and quantity by the data processing system to form a demand quantity for a part;
    comparing by the data processing system the demand quantity for the part with a current inventory quantity for the part;
    determining by the data processing system if the demand quantity for the part is greater than the current inventory quantity for the part; and
    responsive to determining that the demand quantity for the part is greater than the current inventory quantity for the part, updating by the data processing system the conditioned part inventory by the current inventory quantity for the part.

3. The computer implemented method of claim 2, further comprising:
    responsive to determining that the demand quantity for the part is not greater than the current inventory quantity for the part, updating by the data processing system the conditioned part inventory by the demand quantity for the part.

4. The computer implemented method of claim 1, further comprising:
    determining by the data processing system a total conditioned part inventory available for material requirements planning consideration.

5. The computer implemented method of claim 1, further comprising:
    outputting by the data processing system the stored inventory data in a report for a user to review.

6. The computer implemented method of claim 1, wherein the conditioned part inventory is the current part inventory that is adjusted to include additional data regarding loaner parts and used parts.

7. The computer implemented method of claim 1, wherein the loaner parts are parts that were utilized only once in an internal loaner program for less than a legally determined period of time and are still under warranty.

8. The computer implemented method of claim 5, wherein the report is a time phased report, and wherein the time phased report projects future demand and serviceability requirements for a particular part over predetermined periods of time to forecast purchasing requirements for the particular part.

9. A data processing system for performing a part inventory analysis, comprising:
    a bus system;
    a storage device connected to the bus system, wherein the storage device includes a set of instructions; and a processing unit connected to the bus system, wherein the processing unit executes the set of instructions to determine current order demands on a current part inventory in response to determining the current part inventory, segment the current part inventory into a new part inventory segment, a used part inventory segment, and a loaner part inventory segment to form a segmented part inventory, determine an order demand coverage for each segment of the segmented part inventory based on the current order demands for new parts in the new part inventory segment used to fill both external orders and internal orders, used parts in the used part inventory segment used to only fill internal orders, and loaner parts in the loaner part inventory segment used to only fill external orders, determine a conditioned part inventory for each segment of the segmented part inventory based on a loaner part inventory analysis, wherein the loaner part inventory analysis reduces available inventory in the used part inventory segment by a number of used parts that cannot be used to fill internal order demands and reduces available inventory in the loaner part inventory segment by a number of loaner parts that cannot be used to fill external order demands to obtain a netted available inventory, calculate a part purchase recommendation based on the conditioned part inventory, and store data for the segmented part inventory, the order demand coverage, the conditioned part inventory, and the part purchase recommendation in a storage device to form stored inventory data.

10. The data processing system of claim 9, wherein the processing unit executes a further set of instructions to pull a demand part and quantity to form a demand quantity for a part in response to determining the current order demands on the current part inventory, compare the demand quantity for the part with a current inventory quantity for the part, determine if the demand quantity for the part is greater than the current inventory quantity for the part, and update the conditioned part inventory by the current inventory quantity for the part in response to determining that the demand quantity for the part is greater than the current inventory quantity for the part.

11. The data processing system of claim 10, wherein the processing unit executes a further set of instructions to update the conditioned part inventory by the demand quantity for the part in response to determining that the demand quantity for the part is not greater than the current inventory quantity for the part.

12. The data processing system of claim 9, wherein the processing unit executes a further set of instructions to determine a total conditioned part inventory available for material requirements planning consideration.

13. The data processing system of claim 9, wherein the processing unit executes a further set of instructions to output the stored inventory data in a report for a user to review.

14. A non-transitory computer program product for performing a part inventory analysis, the computer program product comprising:
a computer usable medium having computer usable program code embodied therein, the computer usable medium comprising:
computer usable program code configured to determine current order demands on a current part inventory in response to determining the current part inventory;
computer usable program code configured to segment the current part inventory into a new part inventory segment, a used part inventory segment, and a loaner part inventory segment to form a segmented part inventory;
computer usable program code configured to determine an order demand coverage for each segment of the segmented part inventory based on the current order demands for new parts in the new part inventory segment used to fill both external orders and internal orders, used parts in the used part inventory segment used to only fill internal orders, and loaner parts in the loaner part inventory segment used to only fill external orders;
computer usable program code configured to determine a conditioned part inventory for each segment of the segmented part inventory based on a loaner part inventory analysis, wherein the loaner part inventory analysis reduces available inventory in the used part inventory segment by a number of used parts that cannot be used to fill internal order demands and reduces available inventory in the loaner part inventory segment by a number of loaner parts that cannot be used to fill external order demands to obtain a netted available inventory;
computer usable program code configured to calculate a part purchase recommendation based on the conditioned part inventory; and
computer usable program code configured to store data for the segmented part inventory, the order demand coverage, the conditioned part inventory, and the part purchase recommendation in a storage device to form stored inventory data.

15. The computer program product of claim 14, further comprising:
computer usable program code configured to pull a demand part and quantity to form a demand quantity for a part in response to determining the current order demands on the current part inventory;
computer usable program code configured to compare the demand quantity for the part with a current inventory quantity for the part;
computer usable program code configured to determine if the demand quantity for the part is greater than the current inventory quantity for the part; and
computer usable program code configured to update the conditioned part inventory by the current inventory quantity for the part in response to determining that the demand quantity for the part is greater than the current inventory quantity for the part.

16. The computer program product of claim 15, further comprising:
computer usable program code configured to update the conditioned part inventory by the demand quantity for the part in response to determining that the demand quantity for the part is not greater than the current inventory quantity for the part.

17. The computer program product of claim 14, further comprising:
computer usable program code configured to determine a total conditioned part inventory available for material requirements planning consideration.

18. The computer program product of claim 14, further comprising:
computer usable program code configured to output the stored inventory data in a report for a user to review.

* * * * *